United States Patent [19]

Himmelstein et al.

[11] E - Re. 28,899

[45] Reissued July 13, 1976

[54] TORQUE CONTROL APPARATUS

[75] Inventors: Sydney Himmelstein, Lake Forest; Richard S. Tveter, Barrington, both of Ill.

[73] Assignee: S. Himmelstein and Company, Elk Grove Village, Ill.

[22] Filed: Apr. 2, 1975

[21] Appl. No.: 564,272

Related U.S. Patent Documents

Reissue of:

[64] Patent No.: 3,827,506
Issued: Aug. 6, 1974
Appl. No.: 318,864
Filed: Dec. 27, 1972

U.S. Applications:

[63] Continuation-in-part of Ser. No. 288,379, Sept. 12, 1972, abandoned.

[52] U.S. Cl. ..... 173/12; 81/52.5; 91/29; 91/59

[51] Int. Cl.[2] ..... B25B 23/14

[58] Field of Search ..... 173/12, 20; 81/52.5; 91/29, 59

[56] References Cited

UNITED STATES PATENTS

| | | | |
|---|---|---|---|
| 3,180,612 | 4/1965 | Spyridakis et al. | 173/12 X |
| 3,439,754 | 4/1969 | Pantel | 173/12 |
| 3,596,718 | 8/1971 | Fish et al. | 173/12 |

*Primary Examiner*—Ernest R. Purser
*Attorney, Agent, or Firm*—Wegner, Stellman, McCord, Wiles & Wood

[57] ABSTRACT

A torque-applying apparatus having one or more torque motors each arranged for forcibly threading a first threaded member into tightened association with a corresponding second threaded member. A control is provided for controlling the operation of each torque motor to firstly seat the first threaded member relative to the second threaded member by a rapid threading operation at a low torque. When the seated condition of all of the threaded members is sensed, the control automatically operates each torque motor to slowly apply gradually increasing higher torque to provide a preselected maximum-torque, tightened condition of the threaded members.

30 Claims, 4 Drawing Figures

N.C. START SWITCH STATION I
TORQUEMETER A
TORQUEMETER B
AIR MOTOR
AIR MOTOR
AIR MOTOR SOLENOID VALVE A 3 WAY N.C.
AIR MOTOR SOLENOID VALVE B 3 WAY N.C.
TO HIGH PRESSURE SOL. VALVE OF CONTROL SYSTEM 28a
TO SEPARATE CONTROL SYSTEM 28a
NEEDLE VALVE
STATION I HIGH PRESSURE SOLENOID VALVE 2 WAY N.C.
CHECK VALVE
HIGH PRESSURE REGULATOR
LOW PRESSURE REGULATOR
AIR SUPPLY

TORQUE CONTROL APPARATUS

Matter enclosed in heavy brackets [ ] appears in the original patent but forms no part of this reissue specification; matter printed in italics indicates the additions made by reissue.

CROSS REFERENCE TO RELATED APPLICATIONS

This application comprises a continuation-in-part of application Ser. No. 288,379, filed Sept. 12, 1972, for a "Torque Control Apparatus", said application being now abandoned.

BACKGROUND OF THE INVENTION

1. Field of the Invention

This invention relates to torque-applying apparatus and in particular to controls for automatically controlling such apparatus.

2. Description of the Prior Art

In one form of torque-applying system, nut members are run onto male threaded studs or the like, to provide a tightened, set, condition therebetween. In certain applications, a number of such nut setting tools are operated concurrently to effect a setting of a plurality of nuts for improved speed and efficiency in manufacture of machinery and the like. To prevent overtightening of the nuts, control devices have been incorporated to anticipate the fully tightened condition and thereby discontinue application of torque in anticipate of the final condition which is reached by the inertia of the system. Such anticipatory circuits have the disadvantage of relative inaccuracy in the elements of the torque-applying system which may include solenoid valves having variable time delay characteristics and the like. One example of a prior art torque control system is shown in U.S. Pat. No. 3,596,718 of Charles Dennis Fish et al.

SUMMARY OF THE INVENTION

The present invention comprehends an improved control means for use in a torque applying apparatus providing improved accurracy in setting of a first threaded member in tightened association with a second threaded member. The invention comprehends such a control means causing the torque means of the apparatus to develop a relatively low torque for rapidly threading the first threaded member into a seated association with the second threaded member, and subsequently causing the torque means to slowly develop a higher torque for applying a preselected maximum torque between the seated threaded members to provide a desired preselected tightened, or set, condition of the threaded members. The control includes means for sensing the amount of torque applied between the threaded members, and the setting means is responsive to the sensing means to effect the desired torque setting of the threaded members.

Means may be provided in the control for apply a starting pulse momentarily between the threaded members at the initiation of application of the low seating torque to break the members free at the start of the threading cycle. The pulse applying means may comprise means for applying high torque as used in the setting operation momentarily to the threaded members prior to initiation of the seating operation.

The invention comprehends providing a plurality of such torque means for concurrently setting a plurality of first threaded members into tightened association with a corresponding plurality of second threaded members. The control may be provided with means for preventing operation of said setting means until each of the first threaded members is in seated association with its associated second threaded member.

The torque means may comprise a pneumatic motor, and where a plurality of such motors is utilized for setting concurrently a plurality of threaded members, similar pneumatic pressure may be applied concurrently to each of the motors.

Thus, the torque-applying apparatus control of the present invention provides a rapid setting of threaded members without overshooting of the torque as may result from the rotation inertia of the system as in conventional setting devices. The control provides a slow buildup of the setting torque to define a time expansion means, avoiding inaccuracies in the setting of the threaded members such as may result from variable valve operation time constants, threaded member characteristics, and rate of setting. The control is adapted to be utilized with existing torque-applying apparatuses and includes simplified control means including automatic signalling displays for facilitated setting of a plurality of such threaded means. The setting torque is not determined by anticipatory control means, but rather, is determined accurately by the preselected value as reached in the set condition of the threaded members. The control provides a continuous monitoring of the applied torque through improved strain gauge torquemeter means and associated torque readout and control/logic circuitry. Permanent records of the torque values applied to the different threaded means may be provided through suitable associated recording means.

The torquemeter may comprise a hollow torquemeter having one portion connected to the torque motor and another portion to the second of the threaded members so as to provide a constant indication of the torque applied by the torque motor between the threaded members. Other torquemeter types, such as an in-line crystal or stain gauge transducers, may be used.

The torquemeter disclosed herein comprises an improved torquemeter eliminating spurious signals from extraneous bending and thrust loads and is substantially independent of temperature variations.

The torque-applying apparatus control of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figures 1, 2:
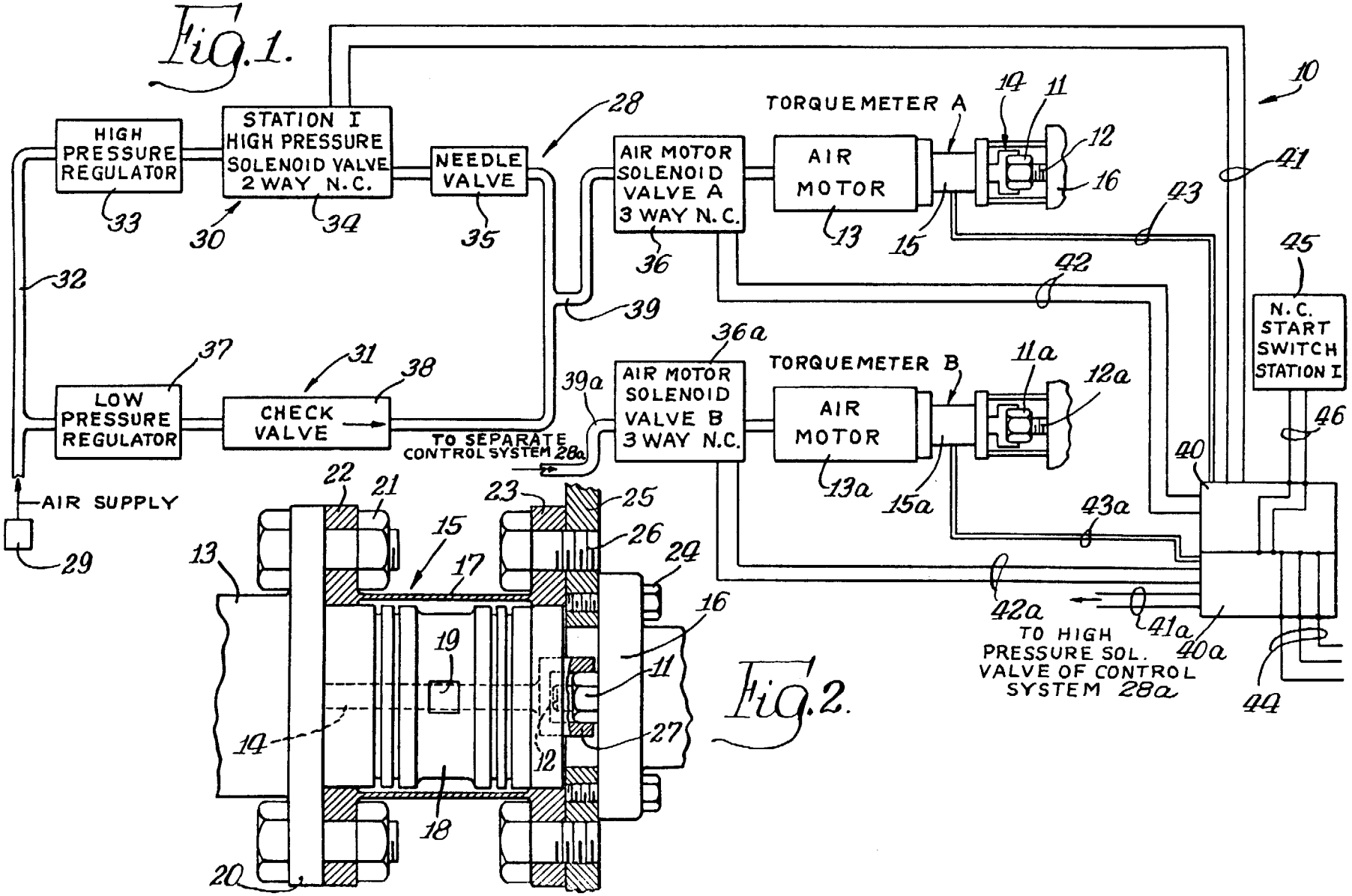
FIG. 1 is a schematic block diagram of a torque-applying apparatus having a control embodying the invention.
FIG. 2 is a diametric section of the torque-applying apparatus.

In the exemplary embodiment of the invention as shown in the drawing, a torque-applying apparatus generally designated 10 comprises means for threading a first threaded member 11 onto a second threaded member 12. In the illustrated embodiment, first threaded member 11 comprises a nut and second threaded member 12 comprises a stud onto which the nut is threaded. Torque to effect the threading operation is provided by a torque motor 13 having a spindle 14 adapted to rotate the nut 11. The spindle extends through a hollow reaction torquemeter 15 which is connected between the torque motor 13 and the support 16 carrying the stud 12 to provide constantly a signal indicating the amount of torque developed by the torque motor in threading the nut onto the stud. In the illustrated embodiment, a plurality of nuts are threaded concurrently to a corresponding plurality of studs, and more specifically in FIG. 1, a second station is illustrated wherein a second torque motor 13a is shown in association with a second torquemeter 15a for controlling the setting of a second nut 11a on a second stud 12a. As will be obvious to those skilled in the art, any suitable number of such stations may be paralleled therewith. However, in describing the structure of the invention, the description will be limited primarily to the first described structure utilizing torque motor 13, spindle 14, and torquemeter 15, it being understood that the other stations are substantially identical thereto.

As shown in FIG. 2, torquemeter 15 includes a torque transmitting tube 17 and a torque measuring tube 18 carrying suitable strain gauges 19 defining a transducer for providing an electrical signal corresponding to the torque being transmitted through the torquemeter. The torque motor 13 includes an end flange 20 having the torque transmitting tube 17 secured thereto by means of bolts 21 extending through motor flange 20 and a turned flange 22 at one end of the torque transmitting tube. The other end of the torque transmitting tube is provided with a flange 23 which is secured to the support 16 by means of bolts 24 threaded into an intermediate support 25 which is, in turn, secured to the flange 23 by bolts 26. The spindle 14 extends coaxially through the torque measuring tube 18 and includes a socket head 27 adapted to engage the nut 11 for threading it onto the stud 12 as an incident of rotation of the spindle 14 by the torque motor 13.

The torquemeter 15 comprises an improved hollow reaction torquemeter which is described more fully in copending application Ser. No. 238,239 of Richard S. Tveter, identified as "Hollow Reaction Torquemeter," and owned by the assignee hereof, to which application reference may be had for more specific details of the construction of the torquemeter. The present invention is directed more specifically to the means for controlling the torque motors by the torquemeters to provide a facilitated accurate setting of the nuts as discussed below.

In the illustrated invention, the torque motors comprise pneumatically operated air motors, it being understood that other suitable torque motors, such as hydraulic or electric torque motors, may be utilized by suitable modifications of the control as will be obvious to those skilled in the art. Thus, in the illustrated embodiment, air is supplied to the pneumatic control system generally designated 28 from a source 29 of pressurized air which, illustratively, may have a pressure of approximately 100 p.s.i. The air is delivered to a high pressure supply portion 30 and to a low pressure supply portion 31 of the pneumatic control 28 through a suitable distribution duct 32. The high pressure control includes a conventional high pressure regulator 33 and a two-way solenoid valve 34 which comprises a normally closed valve. A restrictor illustratively in the form of a needle valve 35 is connected in series with the regulator 33 and valve 34 for providing a slow buildup of high pressure when a second solenoid valve 36 comprising a normally closed three-way valve leading to air motor 13 is opened. The low pressure control includes a conventional low pressure regulator 37 for regulating the pressure illustratively at a low pressure of approximately 50 p.s.i. connected in series with a conventional check valve 37 which is connected to the solenoid valve 36 through a common connecting duct 39. As indicated above, additional nut setting devices may be provided in parallel and, thus, additional torque motor solenoid valves, such as solenoid valve 36a, may be provide in parallel with solenoid valve 36 for concurrently operating each of the plurality of nut setting devices. The operation of the solenoid valves 34 and 36 (including solenoid valve 36a, etc.) is controlled by a suitable electrical control 40 through suitable electrical conductors 41 (41a etc.), 42 (42a etc.) as a function of the signals delivered from the torquemeters 15 (15a etc.) connected to control 40 by suitable conductors 43 (43a etc.). Suitable operating power may be provided to control 40 by power supply lead 44 and operation of the system may be manually controlled by a conventional normally closed "start" pushbutton station 45 connected to the control 40 by suitable conductors 46.

Each additional nut setting device is preferably connected to a separate air supply control system 28a etc. as shown in FIG. 1. Such individual air supplies to the different air motors permit adjustment of the air delivery to the air motors for accurate correlation with the desired torque profiles which are a function of the characteristics of the individual air motors. Thus, optimum control of a plurality of concurrent threading operations is obtained.

Figures 3, 4:
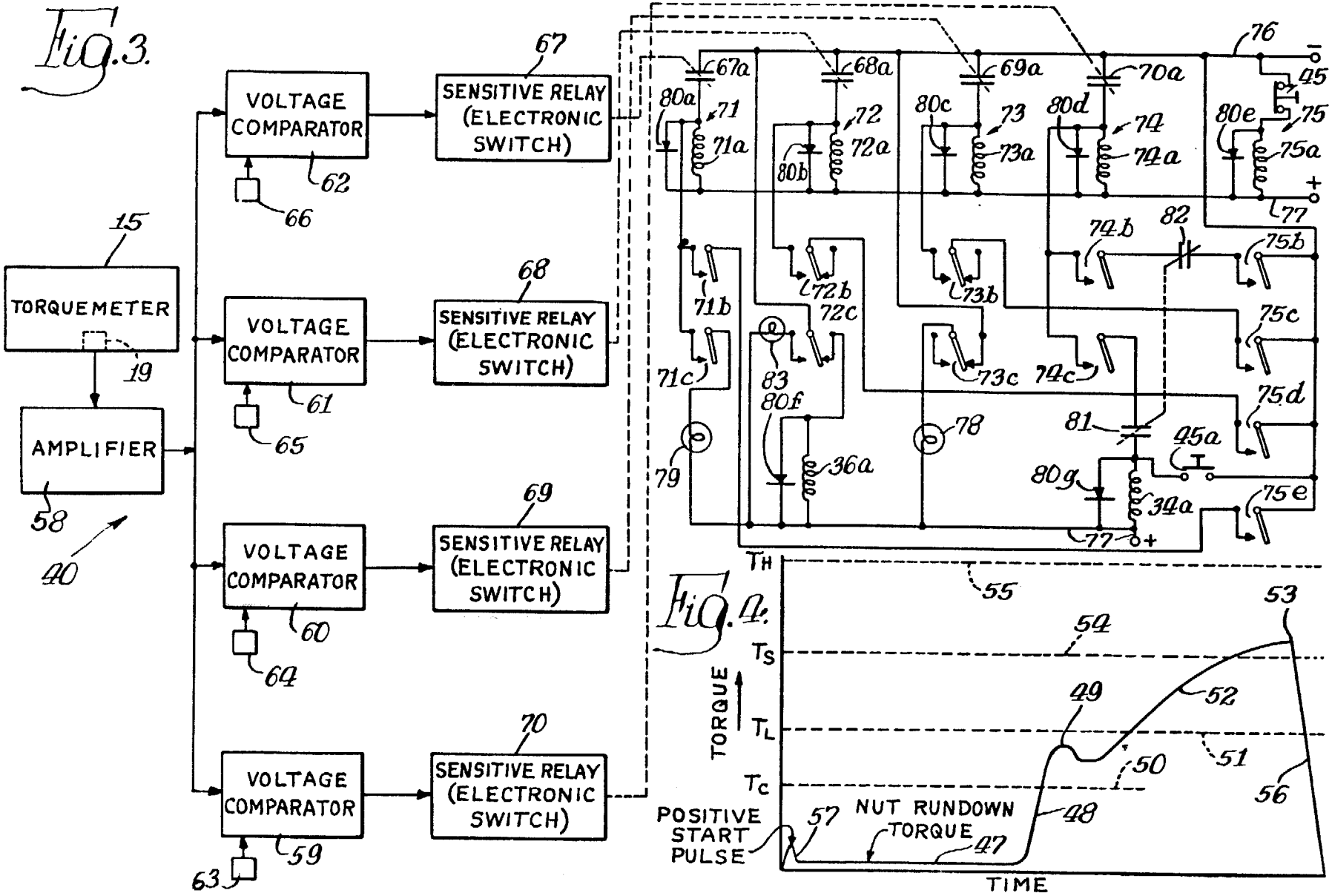
FIG. 3 is a schematic wiring diagram of the control.
FIG. 4 is a graph illustrating the torque conditions during the seating and setting operations of the torque-applying apparatus.

Control 40 is arranged to provide a two-step tightening of the nut 14 on stud 12 to permit high accuracy in the setting of the nut on the stud with a preselected maximum torque. As shown in FIG. 4, control 40 operates the air motor 13 to provide a relatively low rundown, or seating, torque which quickly threads the nut onto the stud into a seated condition, as shown at 47 on the torque time graph. When the nut reaches the seated condition, the torque rises rapidly as shown at 48 to a peak 49 which is above a preselected seating torque $T_c$ 50 and below a low torque limit $T_L$ 51. At this point, control 40 opens solenoid valve 34 which, by virtue of the flow restriction afforded by needle valve 35, provides a slow buildup of torque, as shown at 52, to a maximum preselected torque 53 which is approximately at a preselected set torque 54. As shown in the graph of FIG. 4, the control sets maximum torque 55 as an upper safety limit in operation of the system above the preselected maximum desired torque 53, as will be brought out more fully hereinafter. When the preselected torque 53 is reached, the torque quickly drops to zero, as shown at 56.

As shown at 57 in FIG. 4, a pulse of high pressure is provided at the initiation of the threading cycle to break the nut free on the stud and assure threading thereof to the seated condition. Once the nut is broken free, the torque applied is the relatively low torque 47 as discussed previously.

Control 40 is more specifically illustrated in FIG. 3. The signal from the torquemeter strain gauge 19 is delivered to an amplifier (d-c or carrier type) suitable for use with conventional strain gauges. Illustratively, the amplifier may comprise a Model 8000 amplifier manufactured by S. Himmelstein & Co., the assignee hereof, a Model 311A amplifier manufactured by the Hewlett-Packard Co., a Model 3C66 amplifier manufactured by Tektronix, Inc., and the like. The output from amplifier 58 preferably comprises a standardized voltage directly proportional to the measured torque developed by the torque motor 13. The output voltage from the amplifier is concurrently applied to the input of four voltage comparators 59, 60, 61 and 62. Voltage comparator 59 has a second reference input voltage delivered thereto from a stable power supply 63 corresponding to the torque $T_c$ illustrated in FIG. 4. Voltage comparator 60 has a second reference input voltage delivered thereto from a stable power supply 64 corresponding to the torque $T_L$ of FIG. 4. Comparator 61 has a second reference input voltage delivered thereto from a stable power supply 65 corresponding to torque $T_S$ of FIG. 4. Voltage comparator 62 has a second reference input voltage delivered thereto from a stable power supply 66 corresponding to torque $T_H$ of FIG. 4. The voltage comparators function in the conventional manner so that when the voltage delivered from amplifier 58 is at least equal to the reference voltage delivered from the power supplies 63, 64, 65 and 66 to a comparator, that comparator changes state in that it goes from zero to saturation. As is well known to those skilled in the art, other voltage comparators may be employed such as those that will go from plus to minus saturation, a solid state switch or diode coupled relay being utilized in combination therewith.

The output change from the voltage comparators is delivered to corresponding sensitive relays 67, 68, 69 and 70. As will be obvious to those skilled in the art, the sensitive relays may comprises electronic switches, and may have four normally open contacts 67a, 68a, 69a and 70a. Voltage comparators are conventional devices manufactured by a large number of manufacturers, such as Texas Instruments, Inc., Fairchild Camera and Instrument Corporation, etc. The voltage comparators combine with the sensitive relays to form a bistable trip with an adjustable trip point, a voltage sensitive relay driver, or adjustable solid state meter relay. As is well known in the art, combination assemblies of such voltage comparators and sensitive relays are manufactured by manufacturers such as California Electronic Manufacturing Co., Alamo, Calif.

As shown in FIG. 3, each of the normally open contacts 67a-70a is connected in series with an electromechanical relays 71, 72, 73 and 74, respectively. A fifth relay 75 is provided with a coil 75a is used for resetting the control, as will be brought out more fully hereinafter.

Power is supplied to the control through power supply leads 76 and 77 from a suitable direct current power supply (not shown). Reset coil 75a is connected in series with the normally closed pushbutton 45 contacts across the power supply to energize the relay and thereby close normally open contacts 75b, 75c, 75d and 75e connected at one side to power supply lead 76. Assuming that the torque motor 13 has not as yet developed any torque, each of the other relays 71, 72 and 73 is energized. Pushbutton 45 includes a normally open set of contacts 45a which are closed by the momentary operation of the pushbutton station at the initiation of a new threading operation, concurrently with the operation of the normally closed contacts. Illustratively, the pushbutton unit may comprise a single unit having the two different sets of contacts. Energization of the high pressure solenoid 34a of solenoid valve 34 opens the valve to apply a pulse of high pressure to air motor 13 breaking free the nut 11 on stud 12 to provide a positive start of the threading operation. Release of the pushbutton opens the contacts 45a to de-energize solenoid 34a. The solenoid 36a of solenoid valve 36 is energized at this time from the power supply lead 76 through the normally closed contacts 72c. Thus, low pressure air is delivered to the air motor 13 at this time from the supply 29 through regulator 37, check valve 38, duct 39 and open solenoid valve 36.

The torque developed by the air motor, when operated with the low pressure, remains relatively low, as shown at 47 in the graph of FIG. 4, until the nut seats itself relative to the stud 12 at which time the torque developed by the air motor 13 rises to peak 49. When the torque reaches the setting torque 50, relay coil 74a is energized by the closing of contact 70a under the control of sensitive relay 70. Relay coil 74a latches itself in by means of the normally open latching contacts 74b of the relay 74 which are connected in series with the now closed normally open contacts 75b. A second set of normally open contacts 74c are closed by the energization of relay coil 74a to reconnect high pressure solenoid valve solenoid 34a to power supply lead 75, thereby applying high pressure to the air motor 13 through the series connection from the air supply 29 of high pressure regulator 33, solenoid valve 34, needle valve 35, duct 39 and open solenoid valve 36.

The pressure slowly increases as controlled by the restrictor action of needle valve 35 so as to provide a gradually increasing torque, as shown at 52 in FIG. 4. Until the torque reaches the low torque limit 51, a "Low" lamp 78 connected to power supply lead 77 is energized through a set of normally closed contacts 73c of relay 73. When the torque reaches the low limit torque 51 as illustrated in FIG. 4, the relay coil 73a is energized by the closing of contact 69a by sensitive relay 69, thereby opening the contact 73c to deenergize lamp 78 and close normally open contacts 73b connected in series with now closed contact 75c of the relay 75 to provide a holding circuit paralleling contact 69a.

When the torque reaches the preselected desired torque 54 as shown in FIG. 4, relay coil 72a is energized by the closing of contact 68a under the control of sensitive relay 68. The relay coil is then latched in through the closing of normally open contacts 72b connected in series with the now closed contacts 75d and solenoid valve 36 is closed by the deenergization of solenoid 36a resulting from the opening of normally closed contacts 72c. Should the torque rise beyond the preselected point 53 to a high limit torque 55, as shown in FIG. 4, relay coil 71a is energized by the closing of contact 67a by sensitive relay 67. The coil is latched in by the closing of normally open contacts 71b connected in series with the now closed contacts 75e and a et of normally open contacts 71c is closed to energize "High" lamp 79 to indicate the high torque condition. Thus, lamps 78 and 79 cooperatively provide an indication that the torque applied by the air motor 13 to the threaded members is either below the low torque limit 51 or above the high torque limit 55.

Diode suppressors may be connected in parallel with the different coils for limiting the magnitude of transient spikes in the operation of these inductive elements. Thus, diodes 80a is connected in parallel with relay coil 71a, diode 80b is connected in parallel with relay coil 72a, diode 80c is connected in parallel with relay coil 73a, diode 80d is connected in parallel with relay coil 74a, and diode 80e is connected in parallel with relay coil 75a. Diode 80f is connected in parallel with valve solenoid 36a and diode 80g is connected in parallel with valve solenoid 34a.

The operation of normally closed Reset pushbutton 15 resets the entire control by de-energizing the relay coil 75a so as to open contacts 75b, 75c, 75d, and 75e, thus opening the holding circuits to each of the relay coils 71a, 72a, 73a and 74a.

As will be obvious to those skilled in the art, the use of solid state logic and driver circuits may be substituted for the electromechanical relay means disclosed. Alternating current relay coils and solenoid valves similarly may be utilized so that the alternating current power supply may be employed instead of the direct current power supply disclosed. Further, the torques 50 and 51, as shown in the graph of FIG. 4, may be made to coincide, and/or similarly, the torques 51 and 54 may be made to coincide to provide a modified operation of the control.

As indicated above, the control contemplates the concurrent threading of a plurality of nuts on a corresponding plurality of studs such as in mass production techniques. The control functions to assure that all nuts are seated before initiating the high pressure setting operation wherein high torque 52 is applied to slowly reach the desired preselected maximum torque 53 in each of the associated nut and stud sets. To provide this functioning, a set of normally open contacts 81 is provided in series with switch 74c and high pressure valve solenoid 34a and a set of normally open contacts 82 is connected in series with the holding contacts 74b and 75b associated with relay coil 74a. The contacts 81 and 82 are closed by the energization of the relay coil 74a of the high pressure control relay 74 of a second control 40a substantially similar to control 40 controlling valve 36a and torque motor 13a for controlling the threading of nut 11a on stud 12a. Thus, if for any reason the torque applied by air motor 13a between nut 11a and stud 12a does not reach the seating torque 50 to energize the relay 74 of the second control 40a, coil 74a of control 49 is prevented from energizing the high pressure valve solenoid 34a whereby each of the controls maintains the threading means in the low pressure condition until such time as the problem is rectified and all nuts are properly seated to permit initiation concurrently of the high pressure setting operation by each of the air motors. As will be obvious to those skilled in the art, any number of such threading devices and similar controls 40, 40a (etc.) and 28, 28a (etc.) may be utilized in parallel for setting a corresponding number of cooperating threaded elements by means of the common pressurized air support 29.

The use of the high and low controls at torques 50 and 55 provides an indication functioning which may not be required in a particular installation. The primary functioning of the control is to provide a two-step seating and setting operation for improved accurate setting of the threaded members to the preselected torque. The use of the high and low limit lamps and/or recording apparatus as desired, provides a fault indication functioning which is supplementary to the basic threading functioning of the control.

When the nuts are seated on the studs, the control causes a discontinuation of the torque application, as shown at 49 of FIG. 4, so as to eliminate kinetic energy in the spindle 14 to permit accurate final setting of the nuts in the high pressure operational phase. As the high pressure torque phase provides a slow buildup of the torque, a time expansion occurs permitting conventional low cost solenoid valves and control elements having appreciable time delays to be used without substantially adversely affecting the accuracy of the final setting torque. If desired, a further signal lamp 83 may be energized by switch 72c when relay coil 72a is energized to indicate the reaching of the desired preselected set torque 54.

As will be obvious to those skilled in the art, if desired, the control 40 may be arranged to permit independent complete threading operations wherein the setting of the nut and subsequent setting thereof are effected independently of the seating and setting of the other nuts by the other air motors.

The foregoing disclosure of specific embodiments is illustrative of the broad inventive concepts comprehended by the invention.

We claim:

1. In a torque-applying apparatus having torque means for forcibly threading a first threaded member into tightened association with a second threaded member, control means for controlling the operation of said torque means comprising:

seating means for causing said torque means to develop a force in threading the first member into a seated association with said second threaded member;

means for sensing the amount of torque applied between said threaded members; and setting means responsive to said sensing means for causing said torque means to develop a gradually increasing higher [ force ] *torque* for applying a preselected maximum torque between said seated threaded members to provide a preselected tightened condition of said threaded members.

2. The torque-applying control apparatus of claim 1 wherein said means for causing said torque means to develop a higher [ force ] *torque* includes means for slowly increasing the applied torque whereby the applied torque may be accurately limited to said preselected maximum torque when sensed by said sensing means.

3. The torque-applying control apparatus of claim 1 wherein said torque means comprises fluid pressure means and said means for causing said torque means to develop a higher [ force ] *torque* includes restrictor means for slowly increasing the applied torque whereby the applied torque may be accurately limited to said preselected maximum torque when sensed by said sensing means.

4. The torque-applying control apparatus of claim 1 wherein said seating means comprises means for causing said first member to be threaded at high speed at low torque and said setting means comprises means for causing said torque [ force ] to be slowly increased to said preselected maximum.

5. The torque-applying control apparatus of claim 1 further including means for discontinuing application of torque between said threaded members substantially immediately upon reaching said maximum torque.

6. The torque-applying control apparatus of claim 1 further including means for indicating the amount of torque applied between said threaded members.

7. The torque-applying control apparatus of claim 1 wherein said torque means comprises rotary pneumatic motor means.

8. The torque-applying control apparatus of claim 1 wherein said torque means comprises rotary pneumatic motor means for rotating said first threaded members and said sensing means comprises a torquemeter interconnected between said motor means and said second threaded member.

9. The torque-applying control apparatus of claim 1 including indicating means for providing a signal whenever the torque applied between the threaded members is less than a preselected low torque.

10. The torque-applying control apparatus of claim 1 including indicating means for providing a signal whenever the torque applied between the threaded member is greater than a preselected high torque.

11. The torque-applying control apparatus of claim 1 including indicating means for providing a signal whenever the torque applied between the threaded members reaches the preselected maximum torque.

12. In a torque-applying apparatus having torque means for forcibly threading a first threaded member into tightened association with a second threaded member, control means for controlling the operation of said torque means comprising:

means for sensing the amount of torque applied between said threaded members;

setting means responsive to said sensing means for causing said torque means to develop a gradually increasing [ force ] *torque* for applying a preselected maximum torque between said seated threaded members to provide a preselected tightened condition of said threaded members; and means for causing said torque means to apply a pulse of high torque momentarily between said threaded members at the initiation of application of the low seating torque therebetween by said seating means to positively initiate the threading operation.

13. The torque-applying control apparatus of claim 12 wherein said pulse applying means comprises means for utilizing energy stored in the torque means at the conclusion of a prior torque-applying threading operation.

14. The torque-applying control apparatus of claim 12 wherein said pulse applying means comprises means for momentarily operating said setting means for developing said high torque.

15. The torque-applying control apparatus of claim 12 wherein said torque means comprises means operated by fluid pressure and said pulse applying means comprises means for momentarily applying high fluid pressure to said torque means.

16. In a torque-applying apparatus having torque means for forcibly threading a plurality of first threaded members into tightened association with a corresponding plurality of second threaded members, control means for controlling the operation of said torque means comprising:

seating means for causing said torque means to develop a [ force ] *torque* in threading the first members into seated association with said second members;

means for sensing the amount of torque applied between said threaded members;

setting means responsive to said [ sening ] *sensing* means for causing said torque means to develop a gradually increasing higher [ force ] *torque* for applying a preselected maximum torque between said seated threaded members to provide a preselected tightened condition of each of said threaded members; and means for preventing operation of said setting means until each of said first threaded members is in seated association with its associated second threaded member.

17. The torque-applying control apparatus of claim 16 wherein said torque means comprises means operated by fluid pressure and means for applying substantially the same pressure to torque each pair of associated first and second threaded members.

18. The torque-applying control apparatus of claim 16 werein said torque means comprises means operated by fluid pressure and said [ seating ] *setting* means includes a flow restrictor [ in the fluid pressure means ] for controlling the buildup of torque [ pressure ] applied between said threaded members.

19. The torque-applying control apparatus of claim 16 wherein said torque means comprises a plurality of fluid operated means and *said apparatus includes* a plurality of pressurized-fluid supply controls associated one each with said fluid operated means.

20. The torque-applying control apparatus of claim 19 wherein a common fluid pressure source is provided with each of said supply controls being connected thereto.

21. The torque-applying control apparatus of claim 19 wherein each of said supply controls includes adjustable means for slowly increasing *the fluid pressure provided to the fluid operated means for correspondingly gradually increasing* the applied torque.

22. In an apparatus for applying torque to a first threaded member to sequentially firstly seat and then set said member relative to a second threaded member with a preselected maximum torque, a fluid operated torque motor means, means for sensing torque applied between said first and second members, means for causing torque to be delivered from said torque motor means to seat said first member relative to said second member by a relatively low torque, high speed threading of the first member to the seated condition, second means responsive to the sensing means sensing the seated condition for causing the torque delivered from said torque motor means to slowly increase to set said seated threaded member, and means responsive to the sensing of the preselected maximum torque by said sensing means to terminate torque delivery from the torque motor means with the first member set accurately at said preselected torque.

23. The torque applying apparatus of claim 22 wherein said first means comprises solenoid operated apparatus associated with said torque motor means for causing the torque delivery therefrom to be said low torque delivery.

24. The torque applying apparatus of claim 22 wherein said second means comprises solenoid operated apparatus associated with said torque motor means for causing the torque delivery therefrom to be said slowly increasing torque delivery.

25. In an apparatus for applying torque to a first threaded member to sequentially firstly seat and then set said member relative to a second threaded member with a preselected maximum torque, torque means, means for causing said torque means to thread the first member to a seated condition on the second member, sensing means sensing said seated condition, and mechanism associated with said torque means for causing said torque means to provide a low kinetic energy gradually increased torque delivery between said first and second members to tighten said seated members to a preselected-torque seated condition, and means for terminating the torque delivery substantially immediately upon reaching said seated condition.

26. Torque applying apparatus of claim 25 wherein said mechanism includes electrically actuated control means and said sensing means provides an electrical signal suitable to actuate said mechanism control means.

*27. The torque-applying control apparatus of Claim 1 wherein said torque means includes a torque motor and said setting means includes means for slowly building up the input to the torque motor to provide the gradually increasing torque between said seated threaded members.*

*28. The torque-applying control apparatus of Claim 12 wherein said torque means includes a torque motor and said setting means includes means for slowly building up the input to the torque motor to provide the gradually increasing torque between said seated threaded members.*

*29. The torque-applying control apparatus of Claim 16 wherein said torque means includes a torque motor and said setting means includes means for slowly building up the input to the torque motor to provide the gradually increasing torque between said seated threaded members.*

*30. The torque-applying control apparatus of Claim 25 wherein said torque means includes a torque motor and said setting means includes means for slowly building up the input to the torque motor to provide the gradually increasing torque between said seated threaded members.*

* * * * *